United States Patent
Buschbeck et al.

(10) Patent No.: US 12,165,804 B2
(45) Date of Patent: Dec. 10, 2024

(54) ELECTRICAL STEEL SHEET WITH STRUCTURED SURFACE FOR DOMAIN REFINING

(71) Applicant: Siemens Aktiengesellschaft, Munich (DE)

(72) Inventors: Jörg Buschbeck, Nuremberg (DE); Gotthard Rieger, Munich (DE); Carsten Schuh, Baldham (DE); Thomas Soller, Bayern (DE); Rolf Vollmer, Gersfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 819 days.

(21) Appl. No.: 17/293,737

(22) PCT Filed: Oct. 10, 2019

(86) PCT No.: PCT/EP2019/077506
§ 371 (c)(1),
(2) Date: May 13, 2021

(87) PCT Pub. No.: WO2020/099037
PCT Pub. Date: May 22, 2020

(65) Prior Publication Data
US 2022/0005645 A1    Jan. 6, 2022

(30) Foreign Application Priority Data
Nov. 14, 2018 (EP) ..................... 18206272

(51) Int. Cl.
*H01F 41/02* (2006.01)
*B22F 3/24* (2006.01)
(Continued)

(52) U.S. Cl.
CPC ............... *H01F 41/02* (2013.01); *B22F 3/24* (2013.01); *B22F 7/02* (2013.01); *H01F 1/147* (2013.01);
(Continued)

(58) Field of Classification Search
CPC ........... B22F 2003/248; B22F 2301/35; B22F 2998/10; B22F 3/24; B22F 7/02;
(Continued)

(56) References Cited

U.S. PATENT DOCUMENTS

| | | | |
|---|---|---|---|
| 4,085,603 A | 4/1978 | Vanek | ............................... 72/41 |
| 6,577,657 B1 | 6/2003 | Elschner et al. | ................ 372/39 |

(Continued)

FOREIGN PATENT DOCUMENTS

| | | | |
|---|---|---|---|
| CN | 101171651 A | 4/2008 | ............... C21D 8/12 |
| CN | 101360694 A | 2/2009 | ............ A61C 13/00 |

(Continued)

OTHER PUBLICATIONS

Guo, Zhan-bin; "The Study and Design for Voltage Transformer Silicon Steel Sheet Grade Enter Dies"; College of Engineering, Heilongjiang August First Land Reclamation University, China, 2 pages (Chinese w/ English abstract), Aug. 8, 2005.
(Continued)

*Primary Examiner* — Jenny R Wu
(74) *Attorney, Agent, or Firm* — Slayden Grubert Beard PLLC

(57) ABSTRACT

Various embodiments include a method for producing an electrical steel sheet comprising the following steps: placing a green body comprising a first material on a substrate; structuring a surface of the green body; and thermally treating the green body.

11 Claims, 2 Drawing Sheets

(51) Int. Cl.
*B22F 7/02* (2006.01)
*H01F 1/147* (2006.01)

(52) U.S. Cl.
CPC ..... *B22F 2003/248* (2013.01); *B22F 2301/35* (2013.01); *B22F 2998/10* (2013.01)

(58) Field of Classification Search
CPC .......... H01F 1/147; H01F 27/245; H01F 3/02; H01F 41/02; H01F 41/024; Y02P 10/25
See application file for complete search history.

(56) References Cited

U.S. PATENT DOCUMENTS

| | | | |
|---|---|---|---|
| 10,086,432 B2 * | 10/2018 | Panat | B29C 70/882 |
| 2009/0145526 A1 | 6/2009 | Arai et al. | 148/512 |
| 2009/0189315 A1 | 7/2009 | Günster et al. | 264/442 |
| 2009/0320255 A1 | 12/2009 | Ganster et al. | 29/25.35 |
| 2013/0026170 A1 | 1/2013 | Zerfas et al. | 220/315 |
| 2017/0072654 A1 | 3/2017 | Casellas et al. | 419/6 |
| 2017/0236639 A1 * | 8/2017 | Pieper | B22F 10/25 219/76.12 |
| 2017/0338724 A1 | 11/2017 | Arakawa et al. | |
| 2018/0017868 A1 * | 1/2018 | Suehiro | C21D 8/12 |
| 2018/0057956 A1 | 3/2018 | Kobayashi | C25F 3/14 |
| 2019/0020232 A1 | 1/2019 | Büttner et al. | |
| 2019/0061057 A1 | 2/2019 | Brunhuber et al. | |
| 2019/0108941 A1 * | 4/2019 | Rong | B22F 12/53 |

FOREIGN PATENT DOCUMENTS

| | | | |
|---|---|---|---|
| CN | 101601147 A | 12/2009 | ........... H01L 41/083 |
| CN | 102718499 A | 10/2012 | ............. C04B 35/01 |
| CN | 106660293 A | 5/2017 | ............. B30B 15/30 |
| CN | 106782757 A | 5/2017 | ............... H01B 1/02 |
| CN | 108260348 A | 7/2018 | ............. B22F 3/105 |
| CN | 108496293 A | 9/2018 | ............... H02K 1/02 |
| CN | 108574019 A | 9/2018 | ............... H01G 9/20 |
| EP | 3 257 973 | 12/2017 | ................ C25F 3/06 |
| EP | 3 332 905 | 6/2018 | ........... B23K 26/342 |
| TW | 201219343 A | 5/2012 | ............. B32B 18/00 |

OTHER PUBLICATIONS

Chinese Office Action, Application No. 201980085408.4, 6 pages, Feb. 11, 2023.
Search Report for International Application No. PCT/EP2019/077506, 13 pages, Feb. 4, 2020.
Chinese Office Action, Application No. 201980085408.4, 7 pages, Sep. 23, 2022.

* cited by examiner

ELECTRICAL STEEL SHEET WITH STRUCTURED SURFACE FOR DOMAIN REFINING

CROSS-REFERENCE TO RELATED APPLICATIONS

This application is a U.S. National Stage Application of International Application No. PCT/EP2019/077506 filed Oct. 10, 2019, which designates the United States of America, and claims priority to EP Application No. 18206272.9 filed Nov. 14, 2018, the contents of which are hereby incorporated by reference in their entirety.

TECHNICAL FIELD

The present disclosure relates to steel. Various embodiments of the teachings herein include methods for producing an electrical steel sheet and/or electrical steel sheets produced by means of said methods.

BACKGROUND

Electric machines consist of variously arranged windings through which electric current flows. The magnetic flux arising therefrom is guided in a magnetic circuit known as the magnetic core or iron core. This core consists of materials which can conduct the magnetic flux well, made, for example, of coated electrical steel sheet. The coating serves to prevent undesirable eddy currents.

Standard cores are made from punched-out individual steel sheets which are traditionally insulated with paper layers glued onto one side or, in a more modern form, chemically applied phosphatizing layers. The steel sheet thickness for normal uses in electric machines is typically between 0.35 mm and 0.50 mm. For electrical transformers of higher frequencies or for particularly low loss devices, thinner steel sheets with grain orientation and 0.35 mm thickness are used. Cut strip-wound cores and annular cores are often wound from still thinner, also insulated, bands. So-called NO20 steel sheets with a thickness of 0.20 mm have also previously been considered.

During the operation of magnetic cores, losses known as iron losses or core losses arise due to the alternating polarity of the magnetic field in the core. They are the sum of the hysteresis losses, the eddy current losses, the excess or supplementary losses and the remanence losses. The excess or supplementary losses, which are also known as anomalous eddy current losses, are attributable to the energy requirement that arises during the magnetization of magnetic elements due to the displacement of the Bloch walls. For high levels of induction, they can be ignored in comparison with the hysteresis and eddy current losses; for lower levels of induction, they can play a significant part.

The anomalous eddy current losses in the electrical steel sheet can be reduced by structuring the surfaces of the electrical steel sheet. Therein, the surface is to be structured so that a domain refinement, that is, an advantageous influencing of the magnetized domains, which are also known as Weiss domains, is achieved in the electrical steel sheet. An exemplary surface structuring for domain refining is disclosed in the European patent application EP 0 869 190 A1. Therein, electrical steel sheets have a large number of grooves on the surface with a groove width of 50 μm to 1000 μm and a groove depth of 10 μm to 50 μm.

Some solutions include using surface structures with slots by etching or by means of laser. All these methods and structures have previously been used on conventional rolled electrical steel sheets. New methods for producing electrical steel sheets for electric machines are screen printing and stencil printing. Herein, firstly a printing paste is created starting with metal powders. Then this is processed into a thick layer, also known as a green body or a green compact, by means of screen or stencil printing. Subsequently, the green body formed is converted through thermal treatment to a metallic sheet.

A further process which could potentially be suitable for producing an electrical steel sheet is tape casting. The tape casting process consists of dispersing a finely ground powder in a solvent mixture with the addition of suitable dispersing agents, adding organic binders and plasticizers and processing it into a viscous castable slurry. The shaping takes place with a blade in accordance with the doctor blade process. During the drying process, the solvent is completely removed and a flexible, cuttable and punchable green tape is produced. The organic components contained in the tape are completely removed during the binder removal and sintering process. The height of the cast tape can be influenced by the slurry rheology and the blade gap.

In the case of electrical steel sheets which conventionally have not been rolled, but rather were manufactured using a printing process or a tape casting method, the anomalous eddy current losses mentioned in the introduction can occur.

SUMMARY

The teachings of the present disclosure may be used to reduce the anomalous eddy current losses in electrical steel sheets produced in this way. For example, some embodiments of the teachings herein include a method for producing an electrical steel sheet, wherein the method comprises the following steps: providing a green body (10) on a substrate (30), structuring at least one surface of the green body (10), and, and thermally treating the green body (10).

In some embodiments, the structuring of the surface of the green body (10) takes place by means of additive structuring of the surface by means of an additive production method.

In some embodiments, the additive structuring of the surface takes place by adding elevations (20) with a material that is identical to the material of the green body (10).

In some embodiments, the additive structuring of the surface takes place by adding elevations (20) with a material that is different from the material of the green body (10).

In some embodiments, the additive structuring of the surface takes place with a ferromagnetic or ferrimagnetic material, in particular, a soft ferrimagnetic material.

In some embodiments, the structuring of the surface of the green body (10) is achieved in that the substrate (30) has a surface profile on the side facing toward the green body (10) so that the green body (10) is structured complementary to the surface profile of the substrate (30) on the side facing toward the substrate (30).

In some embodiments, the surface structure of the green body (10) is stamped before its thermal treatment.

In some embodiments, the structuring of the surface is achieved in that the green body (10) is locally partially heated by means of electromagnetic radiation.

In some embodiments, the heating is realized by means of a laser (50).

In some embodiments, the electromagnetic radiation lies in the microwave range.

In some embodiments, the provision of the green body (10) comprises the following steps:

applying a printing paste onto the substrate (30) by means of screen printing or stencil printing and drying the printing paste situated on the substrate (30) to obtain the green body (10).

In some embodiments, the provision of the green body (10) comprises the following steps: applying a castable slurry to the substrate (30), which is configured, in particular, as a tape, and drying the castable slurry situated on the tape to obtain the green body (10).

As another example, some embodiments of the teachings herein include an lectrical steel sheet for an electric machine, wherein the electrical steel sheet has been produced by a method as described herein.

BRIEF DESCRIPTION OF THE DRAWINGS

The teachings of the present disclosure are further described in view of several exemplary embodiments and making reference to the attached drawings, in which.

DETAILED DESCRIPTION

Figure 1:
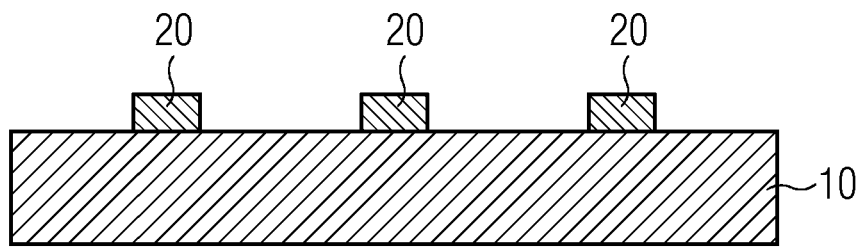
FIG. 1 is a first exemplary embodiment of a method for surface structuring of a green body, incorporating teachings of the present disclosure.

The invention relates to a method for producing an electrical steel sheet, having the following steps:
a) providing a green body on a substrate,
b) structuring at least one surface of the green body, and
c) thermally treating the green body.

A domain refinement in order to reduce anomalous eddy current losses in electrical steel sheets is conventionally known only for rolled electrical steel sheets. Therein, the surface of the finished electrical steel sheet is structured by means of scoring, etching or laser treatment.

An obvious solution to the problem of reducing anomalous eddy current losses in non-rolled electrical steel sheets made in the novel manner would be to transfer the aforementioned and known measures for structuring the surface to printed or tape-drawn electrical steel sheets. In specific terms, the solution would then be achieved of structuring a ready printed or tape-drawn electrical steel sheet by means of scoring, etching or laser treatment.

By this means, a reduction of the anomalous eddy current losses in the electrical steel sheet would also actually be achieved.

However, the present invention selects a completely different approach, which not only differs from the obvious solution described here, but also has decisive advantages over it.

In the method according to the invention, it is not the surface of the ready-made electrical steel sheet, but the surface of the green body that is already structured. Once the printing paste or the castable slurry has dried and a green body exists, the surface of the green body is structured. Only then does the thermal treatment of the green body take place.

The surface structuring undertaken on the green body remains largely intact due to the thermal treatment. It remains intact at least to the extent that it can fulfill its purpose of domain refining.

An important advantage of the method according to the invention lies therein that damage to the crystal structure in the green body, which usually occurs due to the surface structuring, can be annealed out by the subsequent thermal treatment of the green body. For this purpose, no special method step is necessary since the thermal treatment is, in any case, necessary for binder removal and sintering of the green body.

As a result, through the skillful sequence of process steps (producing the green body-structuring the surface-thermally treating the structured green body), it is possible with relatively little additional effort, to achieve a significant reduction in the anomalous eddy current losses in a printed or tape-drawn electrical steel sheet.

The method steps a) to c) have necessarily to be carried out in the stated sequence.

In order to avoid any misunderstandings, there follows a clarification regarding the expression "electrical steel sheet" used in this patent application.

What are designated "electrical steel sheets" in the context of this patent application are not only rolled steel sheets as known from the prior art, but also formed bodies that have been created by means of printing techniques or tape drawing and which have the function and properties of conventional electrical steel sheets. The printed or drawn electrical steel sheets can also be designated "material layers"; this expression is to be regarded as synonymous with "electrical steel sheets". Electrical steel sheets are also known in specialist circles as "magnetic steel sheets" or, depending on the intended purpose, as dynamo, motor or transformer steel sheets.

A sintered electrical steel sheet, that is, an electrical steel sheet which has been made, for example, by means of a printing technique or by tape-drawing including a thermal treatment can differ significantly in its microstructure from an electrical steel sheet which has been made by other methods, for example, rolling.

A "green body" is understood to be the as yet unsintered blank. It can alternatively also be designated a green part or, in the case of tape drawing, as green tape.

The green body provided in step a) can be obtained in a variety of ways.

Firstly, a printing paste can be applied to a substrate by means of screen or stencil printing and this can then be dried.

Screen printing is a printing method in which a printing paste is pressed with a doctor blade through a screen, e.g. a fine-meshed fabric, onto the material to be printed, herein the substrate. At the sites of the fabric where, according to the printing layout, no printing paste is to be printed, the mesh openings of the fabric are made paste-impermeable by a stencil. The fabric carries the template made of plastics, for the production of which the entire surface of the stretched tissue is coated with a photopolymer and is exposed via a positive film with the motif to be printed. The photopolymer cures on the areas not to be printed and the unexposed material is washed out. During the printing process, the printing paste only passes through the fabric where said fabric has been washed free.

During stencil printing without a supporting screen, the stencil must itself be sufficiently strong and is produced, for example, from steel and is pressed directly into the frame. In the case of stencil printing, however, the possible printed images are limited.

The substrate onto which the printing paste is printed can be self-supporting as, for example, plate-shaped. Alternatively, flexible substrates, for example, tapes are also possible.

The printing paste is typically based upon a metal powder.

However, a castable slurry can be applied onto a substrate which is configured, in particular, as a tape and can then be dried.

The castable slurry comprises, for example, a finely ground powder in a solvent mixture. For the dispersion of the powder in the solvent, advantageously, suitable dispersing agents (substance mixtures for accelerating or enabling the dispersion) are added. Optionally, the castable slurry further contains organic binders and/or plasticizers in order to achieve a desired viscosity of the castable slurry.

The shaping of the green body takes place with a doctor blade. Herein advantageously, the doctor blade process that has been used for centuries in the rotogravure and/or intaglio printing process is used.

During the drying process, the solvent is completely removed and a flexible, cuttable and punchable green tape is produced.

The method according to the invention for producing an electrical steel sheet relates, in particular, to the production of printed, in particular, screen or stencil printed, or drawn, in particular, tape-drawn electrical steel sheets.

The structuring of the surface of the green body can be carried out in a variety of ways and with different means. An incomplete list of the different ways of structuring the surface includes:

structuring the surface through additive production methods;

structuring the surface by producing the green body on a structured substrate;

structuring the surface by impressing the structuring;

structuring the surface by local heating of the surface.

Additive production methods (or "additive manufacturing"), also known as 3D printing methods are production methods in which material is applied layer by layer and thus three-dimensional objects can be generated. The layer-wise construction of the object takes place under computer control from one or more materials according to predetermined measurements and forms.

The additive structuring of the surface of the green body therefore takes place by addition of elevations on the surface of the green body.

Therein, a material can be used which is identical to the material of the green body. Alternatively, a material can also be used which is distinctly different from the material of the green body.

For the additive structuring of the surface, a ferromagnetic or ferrimagnetic material, in particular, a soft ferrimagnetic material can advantageously be used. Soft ferrites have a very low electrical conductivity and thus can have an insulating effect. By way of example, manganese zinc ferrites (MnZn) in the composition $Mn_aZn_{(1-a)}Fe_2O_4$ or nickel zinc ferrites (NiZn) in the composition $Ni_aZn_{(1-a)}Fe_2O_4$ can be used as soft ferrites.

The structuring of the surface of the green body by producing the green body on a structured substrate is achieved in that the substrate has a surface profile on the side facing toward the green body. This has the result that the green body is structured, on the side facing toward the substrate, complementary to the surface profile of the substrate.

If the green body is produced, for example, by means of a screen printing method, the structuring of the underside of the green body takes place in that the substrate is lastingly provided with a structuring, for example, with grooves on its upper side. If the printing paste is now pressed through the screen, not only is the surface of the substrate covered generally with the printing paste, but the grooves in the substrate are specifically also filled with the printing paste. After the drying of the printing paste, a green body is thus formed which has on its underside a series of elevations which reproduce in a complementary manner the grooves on the upper side of the substrate.

Similarly, for example, a structuring of the tape is also possible which transfers itself to the dried castable slurry, that is, onto the green body produced by means of a tape-drawing method.

The structuring of the surface by means of embossing methods takes place after the green body has dried at least to a sufficient extent. For this, an embossing stamp is pressed onto the surface to be structured. For this, substantial forces can be necessary. Cold, warm and also hot embossing are usable as the stamping method.

The structuring of the surface of the green body can finally also be achieved in that the green body is locally partially heated by means of electromagnetic radiation.

An advantage of this method is that it is contactless. A further advantage is that, in principle, very fine structures are realizable on the surface of the green body.

The local heating of the green body by means of electromagnetic radiation comprises the vaporization and also the thickening of material close to the surface of the green body.

The heating can be realized by means of a laser, for example, a neodymium-doped yttrium aluminum garnet (Nd:YAG) laser. Alternatively, heating of the green body by means of microwaves, i.e. by means of electromagnetic radiation in the range from 1 mm to 300 mm is possible.

Laser vaporization, also known as laser ablation, is understood to mean the removal of material from the surface by irradiation with pulsed laser radiation. The laser radiation used herein at a high power density leads to rapid heating and the formation of a plasma on the surface. With laser pulses in the nanosecond range, the energy of the laser leads to heating of the surface (due to the thermal movement of the atoms) during the laser pulse. Since the heat conduction enables only a slow conduction of energy into the volume, the energy radiated in is concentrated onto a very thin layer (approximately 1 µm with a 10 ns pulse length) and therefore the surface reaches very high temperatures and sudden vaporization of the material takes place.

The surface structure, for example, grooves which have been created on the green body by laser ablation also remain after the thermal treatment, at least to the extent that a domain refinement of the electrical steel sheet is achieved.

During the densification of material near the surface of the green body due to local heating, however, a vaporization does not occur, but merely a "compression" of the material treated. The effect of this densification lies in the modification of the sintering behavior in the subsequent step of thermal treatment of the green body, and a structuring of the surface results therefrom.

If the green body is created by applying a castable slurry onto the substrate, a further possibility for structuring the surface of the green body exists in the use of a focused spray jet. Depending upon the castable slurry used, the spray jet, in particular, is configured so that focused water or a solvent is sprayed onto the surface of the green body. Thereby, the surface of the green body, in particular, the organic binding agents present there can be selectively solvated and material washed out therefrom. Here also, the structuring arising after the thermal treatment can be obtained to such an extent that a domain refinement of the electrical steel sheet is achieved.

Finally, the invention also relates to an electrical steel sheet produced by means of one of the aforementioned methods.

Such electrical steel sheets can advantageously be used in an electric machine. Included thereby are rotating electric machines, in particular, electric motors and electric generators for converting energy, and static electric machines, in particular, transformers for converting an input alternating voltage into an output alternating voltage.

FIG. 1 illustrates schematically a green body 10, one surface of which has been structured by means of an additive production method. Specifically, a plurality of elevations 20 have been applied layer-wise onto the surface of the green body 10. For this purpose, additive production methods known to a person skilled in the art are used. Following the construction of the elevations 20, there follows a thermal treatment of the green body 10, which both removes binder from, and sinters, the green body 10 as well as annealing the crystal structure of the elevations 20. In the specific example shown in FIG. 1, the green body 10 consists of a material different from that of the layer-wise applied elevations 20. In some embodiments, the same material is used for the elevations 20 as for the green body 10 itself.

Figure 2:
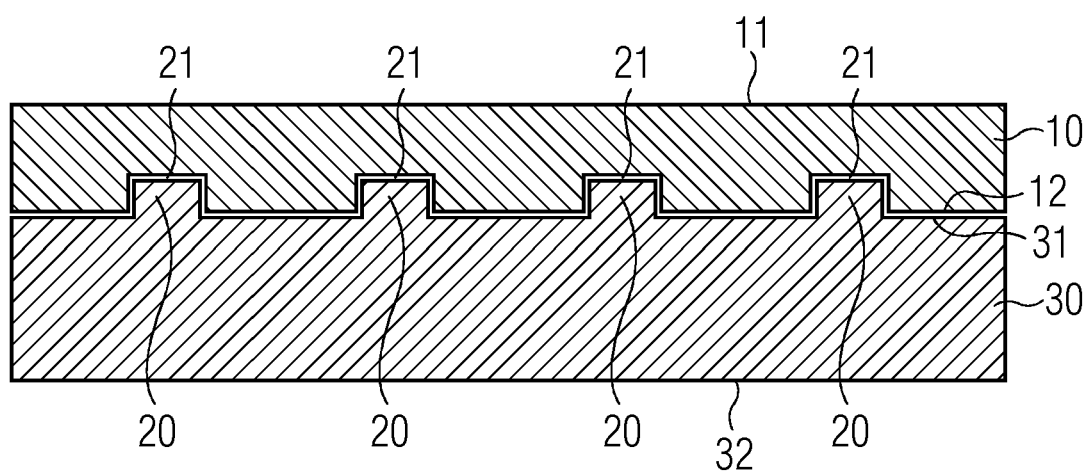
FIG. 2 is a second exemplary embodiment of a method for surface structuring of a green body, incorporating teachings of the present disclosure.

FIG. 2 illustrates a green body 10, one surface of which has been structured by producing the green body 10 on a structured substrate 30. The substrate 30 has a first side 31 and a second side 32 opposite thereto. The first side 31 is provided so that the green body 10 or its starting material is applied thereon. In the case of a printing method for the production of the green body 10, the first side 31 of the substrate 30 is thus provided so that the printing paste is applied thereon. In the case of the tape-drawing for the production of the green body 10, the first side 31 of the substrate 30 is provided so that the castable slurry is applied thereon.

In some embodiments, the substrate 30 is substantially planar. However, it has a plurality of elevations 20 on the first side 31. If the material (e.g., the printing paste or the castable slurry) forming the green body 10 is applied to the substrate 30, the side of the green body 10 facing toward the substrate 30, which is referenced in relation to FIG. 2 as the second side 12, receives a structuring which is complementary to the structuring of the first side 31 of the substrate 30. In the specific example of elevations 20 on the substrate 32, the green body thus has corresponding grooves 21. The side opposite the second side 12 of the green body, which is referred to as the first side 11, however, is substantially planar, that is, unstructured.

Figure 3:
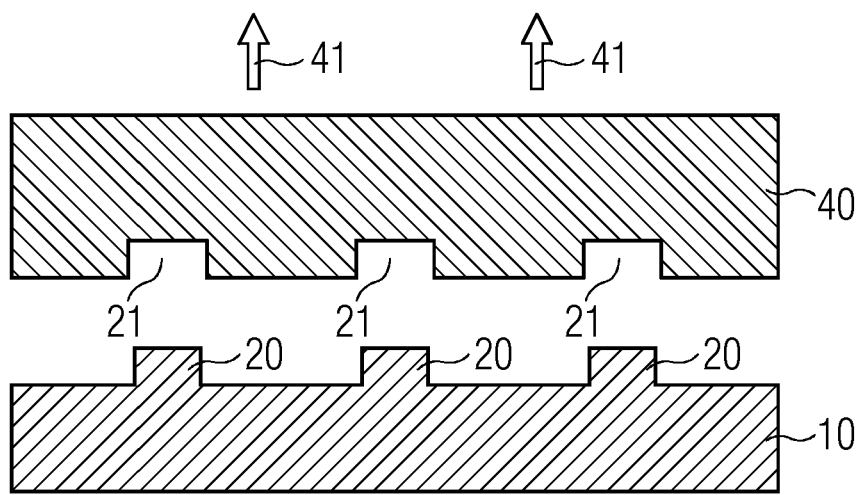
FIG. 3 is a third exemplary embodiment of a method for surface structuring of a green body, incorporating teachings of the present disclosure.

FIG. 3 illustrates a green body 10, one surface of which has been structured by means of a stamping method. In this example, the green body 10 has been dried so a stamping lastingly persists after removal of the embossing stamp. However, the green body must itself still be moldable; this is typically to be achieved with a correspondingly large force on the workpiece, that is, the green body (similarly to, for example, the stamping of coins). The embossing stamp 40 is pressed onto the structured surface of the green body 10 which, in the specific exemplary embodiment of FIG. 3, has a plurality of grooves 21. A complementary structuring may be achieved, for example, with corresponding elevations 20 on the green body 10 in that the regions between the grooves 21 are pressed together or apart. After removal of the embossing stamp 40 (see the movement direction 41 of the embossing stamp 40 moving away in FIG. 3), the structuring of the green body 10 remains.

Figure 4:
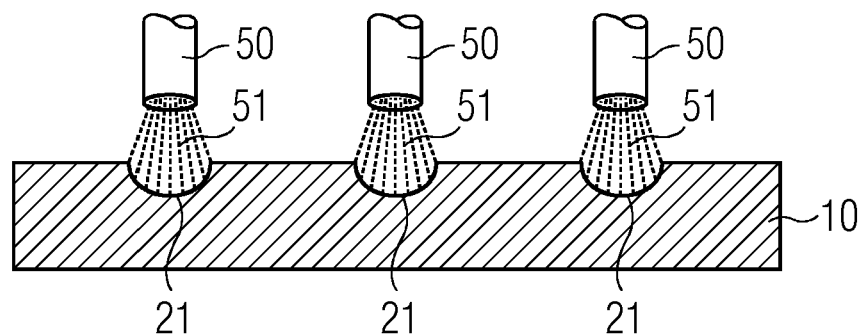
FIG. 4 is a fourth exemplary embodiment of a method for surface structuring of a green body incorporating teachings of the present disclosure.

FIG. 4 illustrates schematically a green body 10, one surface of which is structured by a plurality of lasers 50. In this example, the lasers 50 emit electromagnetic radiation 51 at a high power density. This involves pulsed lasers 50 with laser pulses in the nanosecond range. This leads, in the regions affected, to a rapid heating and the formation of plasma. Due to the very high temperatures, a sudden vaporization of material takes place. The grooves 21 are visible in FIG. 4. The grooves 21 which have been created on the green body 10 by laser ablation also remain after the thermal treatment, at least to the extent that a domain refinement of the electrical steel sheet is achieved.

What is claimed is:

1. A method for producing an electrical steel sheet, wherein the method comprises:
   Placing a first material on a substrate;
   drying the first material to produce a green body;
   structuring a surface of the green body by additive manufacturing; and
   thermally treating the green body after the surface has been structured to produce the electrical steel sheet.

2. The method as claimed in claim 1, wherein structuring the surface includes adding elevations with the first material.

3. The method as claimed in claim 1, wherein structuring the surface includes adding elevations with a second material different from the first material.

4. The method as claimed in claim 1, wherein the additive manufacturing includes adding a ferromagnetic or ferrimagnetic material.

5. The method as claimed in claim 1, wherein the substrate has a surface profile on the side facing toward the green body and structuring the green body results in a structure complementary to the surface profile of the substrate on the side facing toward the substrate.

6. The method as claimed in claim 1, further comprising stamping the surface structure of the green body before thermal treatment.

7. The method as claimed in claim 1, wherein structuring the surface includes heating the green body using electromagnetic radiation.

8. The method as claimed in claim 7, wherein heating includes applying a laser.

9. The method as claimed in claim 7, wherein the electromagnetic radiation lies in microwave range.

10. The method as claimed in claim 1, further comprising fabricating the green body by:
    applying a printing paste onto the substrate using screen printing or stencil printing; and
    drying the printing paste situated on the substrate to obtain the green body.

11. The method as claimed in claim 1, further comprising casting the green body by:
    applying a castable slurry to the substrate; and
    drying the castable slurry to obtain the green body.

* * * * *